US012304196B2

(12) United States Patent
Llorach To et al.

(10) Patent No.: US 12,304,196 B2
(45) Date of Patent: May 20, 2025

(54) PLATEN VACUUM CONTROL

(71) Applicant: Hewlett-Packard Development Company, L.P., Spring, TX (US)

(72) Inventors: Marcel Llorach To, Sant Cugat del Valles (ES); Isidoro Maya Agudo, Sant Cugat del Valles (ES); Ricardo Sanchis Estruch, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 189 days.

(21) Appl. No.: 18/005,416

(22) PCT Filed: Jul. 16, 2020

(86) PCT No.: PCT/US2020/042333
§ 371 (c)(1),
(2) Date: Jan. 13, 2023

(87) PCT Pub. No.: WO2022/015311
PCT Pub. Date: Jan. 20, 2022

(65) Prior Publication Data
US 2023/0256754 A1 Aug. 17, 2023

(51) Int. Cl.
*B41J 11/00* (2006.01)
*B41J 11/06* (2006.01)

(52) U.S. Cl.
CPC ........ *B41J 11/0085* (2013.01); *B41J 11/0095* (2013.01); *B41J 11/06* (2013.01)

(58) Field of Classification Search
CPC ...... B41J 11/0085; B41J 11/0095; B41J 11/06
See application file for complete search history.

(56) References Cited

U.S. PATENT DOCUMENTS

| | | | | |
|---|---|---|---|---|
| 6,047,733 | A | 4/2000 | Blake et al. | |
| 6,328,491 | B1 | 12/2001 | Beehler et al. | |
| 6,336,722 | B1 | 1/2002 | Wotton et al. | |
| 6,409,332 | B1 | 6/2002 | Yraceburu et al. | |
| 6,672,720 | B2 | 1/2004 | Smith | |
| 6,682,238 | B2 | 1/2004 | Yraceburu et al. | |
| 8,025,390 | B2 | 9/2011 | Phillips et al. | |
| 2002/0110400 | A1 | 8/2002 | Beehler et al. | |
| 2007/0126832 | A1* | 6/2007 | Kito ......................... | B41J 11/06 347/101 |

FOREIGN PATENT DOCUMENTS

| | | | |
|---|---|---|---|
| GB | 2354976 | A | 4/2001 |

* cited by examiner

*Primary Examiner* — Justin Seo
(74) *Attorney, Agent, or Firm* — Jordan IP Law, LLC

(57) ABSTRACT

A printing system comprises an air-transmissive platen, a vacuum source, a cap and a controller. The vacuum source is configured to draw air through the platen to bias print media towards the platen. The cap is provided on a surface of the platen, between the vacuum source and the platen. The cap is configured to limit air flow through the platen, and comprises a plurality of closable openings provided in a plurality of zones along a length of the cap in a print media advance direction. The controller is configured to selectively open or close the openings of each of the plurality of zones to permit airflow through a portion of the platen overlain by print media and limit airflow through a portion of the platen not overlain by print media.

15 Claims, 7 Drawing Sheets

PLATEN VACUUM CONTROL

BACKGROUND

In a conventional printer, print media is moved in an advance direction over a platen, and a printhead provided above the print media makes marks on the print media. The printer may comprise a vacuum system to bias the print media towards the platen, for example to reduce curling of print media.

DETAILED DESCRIPTION

Figure 1:
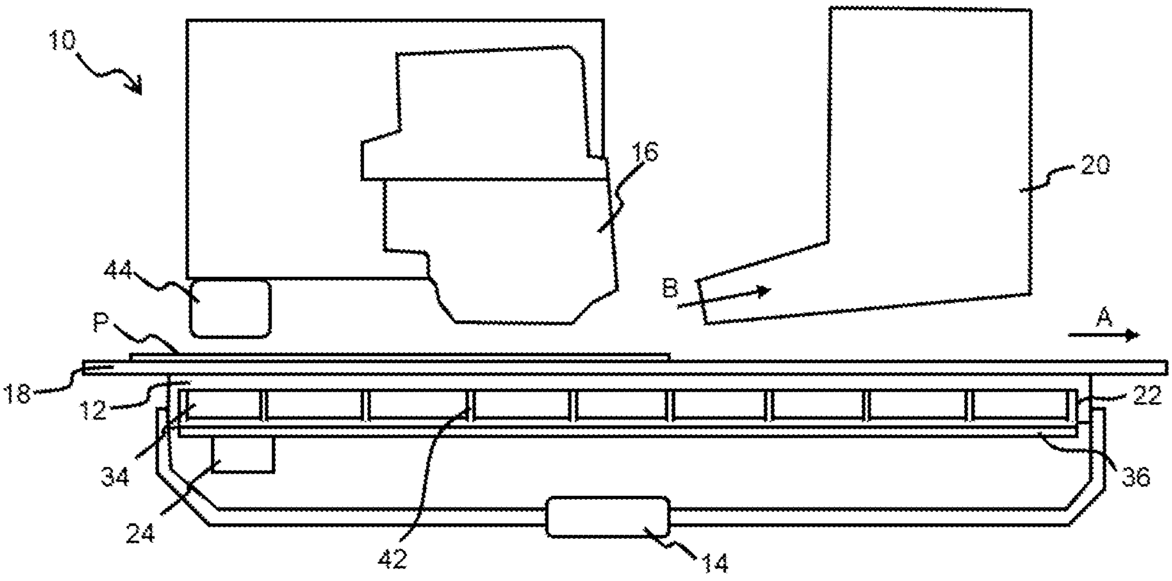
FIG. 1 is an illustration of a section view of a printing system.

An example printing system 10, shown in FIG. 1, comprises an air transmissive platen 12 and a vacuum source 14, for example a fan, configured to draw air through the platen 12 to bias print media P towards the platen 12.

The printing system 10 may comprise a print head 16. In an example, the printing system 10 comprises a plurality of static printheads, forming a page-wide array. This may improve a speed of printing. The printing system 10 may comprise a belt 18 provided over the platen 12 and configured to move the print media under the printhead 16 in the advance direction A. The belt 18 may be configured to move the print media P continuously. The belt 18 may be air transmissive.

The printing system 10 may comprise an airflow bar 20. The airflow bar 20 may be configured to generate airflow under the printhead 16 into the airflow bar 20 in the direction of arrow B, to control the positioning of printing fluid onto the print media. For example, the airflow generated by the airflow bar 20 may control a main drop of printing fluid and satellite drops of printing fluid from the printhead 16 to drop more consistently and predictably onto print media. This may provide improved image quality and reduce air defects and non-uniformities between print head units.

Figure 2:
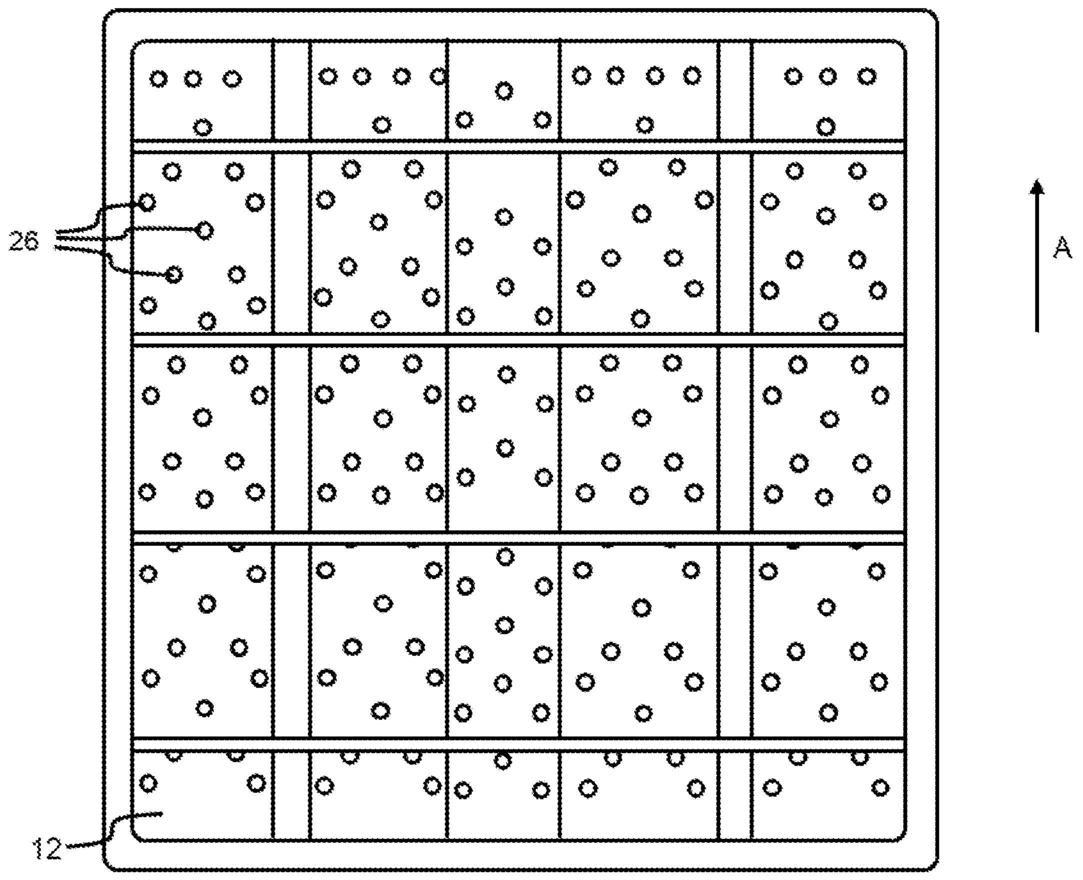
FIG. 2 is an illustration of a platen of the printing system.

The printing system 10 comprises a vacuum controlling apparatus, which may be configured to control the airflow through the platen caused by the vacuum source. As shown in FIG. 2, the platen 12 comprises a plurality of apertures 26 to allow air flow through the platen 12. The vacuum control apparatus is configured to permit or block air flow through apertures 26 in selected portions of the platen 12 according to the position of print media in the advance direction A.

The vacuum control apparatus may be configured to block airflow through the platen 12 at regions of the platen 12 not overlain by print media. This may inhibit changes in airflow under the printhead 16 which may otherwise be generated by a combination of airflow generated by the airflow bar 20 and airflow generated by the vacuum source 14. Defects in the printed image, particularly at the leading and trailing edges of the print media, may thereby be inhibited.

The vacuum controlling apparatus comprises a cap 22 and a controller 24. The cap 22 is provided on a surface of the platen 12, between the vacuum source and the platen 12. The cap 22 is configured to limit air flow through the platen 12.

Figure 3A:
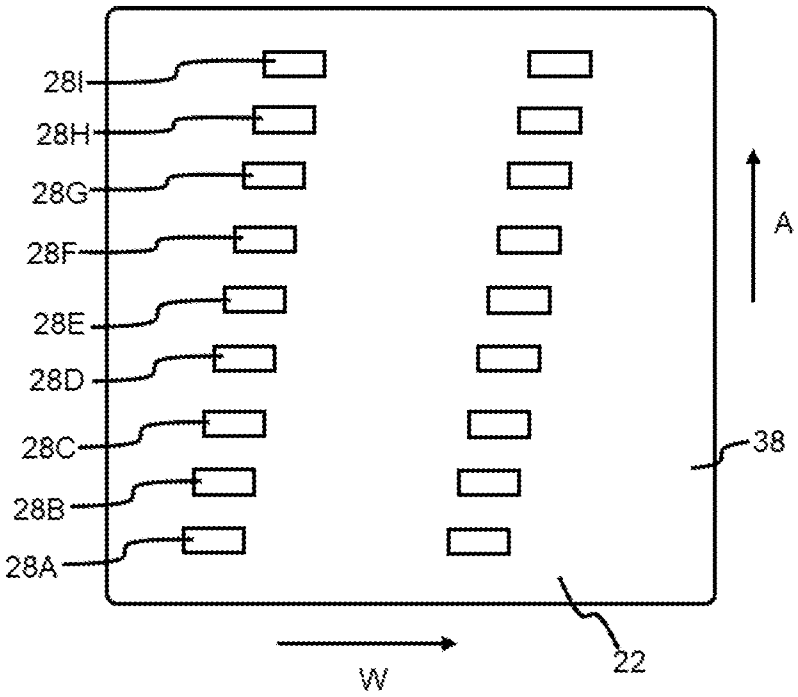
FIGS. 3A and 3B are illustrations of different views of a cap of the printing system.
Figure 3B:
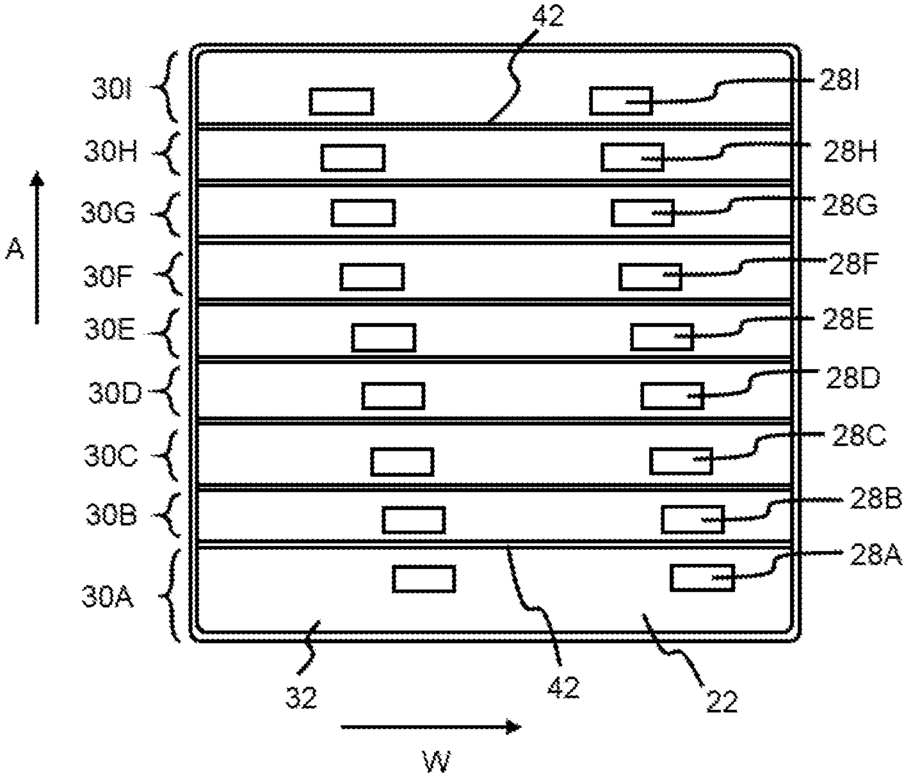

As shown in FIGS. 3A and 3B, the cap 22 comprises a plurality of closable openings 28A-I provided in a plurality of zones 30A-I along a length of the cap 22 in the print media advance direction A. As shown in FIGS. 3A and 3B, the cap may include two openings in each zone. In other examples only one opening may be provided in each zone. In other examples, more than two openings may be provided in each zone.

The cap 22 may be substantially planar and may be configured to lie substantially parallel to the platen. The cap 22 may comprise a first surface 32 facing the platen 12, and a space 34 may be provided between the platen 12 and the first surface 32 of the cap.

The controller 24 is configured to selectively open or close the openings 28A-I of each of the plurality zones 30A-I to permit airflow through a portion of the platen 12 overlain by print media and limit airflow through a portion of the platen 12 not overlain by print media.

Figure 4:
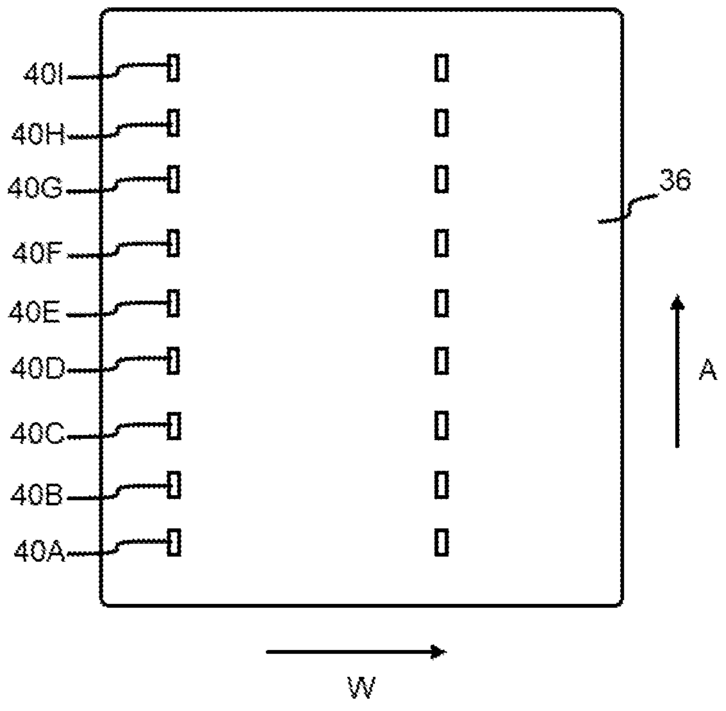
FIG. 4 is an illustration of a movable plate of the printing system.

The vacuum controlling apparatus may comprise a movable plate 36, as shown in FIG. 4, provided over a surface of the cap 22. In an example, the movable plate 36 is provided over a second surface 38 of the cap opposing the first surface 32. In other examples, the movable plate may be provided over the first surface of the cap, so that the movable plate is provided between the cap and the platen.

The movable plate 36 may comprise a plurality of openings 40A-I. The movable plate 36 may be a single plate configured to slide over each of the plurality of closable openings 28A-I of the cap 22 and may be configured to open one or more openings 28A-I in the cap by overlapping an opening in the plate 36 with and opening in the cap 22.

The plurality of openings 40A-I in the movable plate 36 may be provided at positions in the length direction corresponding to the openings 28A-I in the zones 30A-I of the cap 22.

In an example, the plurality of openings 40A-I may be provided at positions in the length direction of the plate 36 corresponding to openings 28A-I in the zones 30A-I of the cap 22, and the controller 24 may be configured to slide the movable plate 36 in the width direction W. In other examples, the plurality of openings may be provided at other positions and the controller may be configured to slide the movable plate in directions other than the width direction. For example, the plurality of openings may be provided at positions in the width direction corresponding to positions of the openings, and the controller may be configured to slide the movable plate in the advance direction to cause one or more openings in the plate to overlap one or more openings in the cap.

In an example, the plurality of openings 40A-I in the movable plate 36 are aligned in the length direction, and the openings 28A-I in the cap 22 are stepped across the width of the cap 22, as shown in FIGS. 3 and 4. For example, an opening 28B in the cap in a second zone 30B may be stepped in the width direction W relative to the opening 28A in a first zone 30A, and an opening 28C in a third zone may 30C be stepped in the width direction W relative to the opening 28B in the second zone 30B. In another example, the plurality of openings in the cap may be aligned in the length direction, and the openings in the movable plate may be stepped across the width of the movable plate.

The length of the movable plate 36 and the cap 22 may correspond to the length of the platen 12. In other examples, there may be provided a plurality of movable plates and/or caps along the length of the platen.

The cap 22 may be spaced apart from the platen 12, so that a volume of air is provided between the cap 22 and the platen 12. The cap 22 may comprise a plurality of dividers 42 extending from the first surface 32 of the cap to the platen 12, to divide the volume of air provided between the cap 22 and the platen 12 into the plurality of zones 30A-I. The dividers 42 may be walls that extend across the width of the cap, so that each zone extends across the width of the cap 22. The dividers 42 may be configured to seal against the platen 12, to seal the zones 30A-I from each other. Accordingly, air may only be permitted to flow through portions of the platen 12 corresponding to zones which are opened. Zones which are not opened are sealed from zones which are opened, and so airflow may be blocked at portions of the platen 12 corresponding to zones which are not opened.

The printing system 10 may comprise a sensor 44 configured to determine a position of the print media on the platen 12. The controller 24 may be configured open or close the openings 28A-1 of zones 30A-1 of the cap 22 according to the position of the print media as the print media moves over the platen 12 in the advance direction.

Relative positions of the movable plate 36 and the cap 22 according to the position of the print media are shown in FIGS. 5A-D. The position of the cap 22 behind the movable plate 36 is indicated by dashed lines in FIGS. 5A-D.

Figure 5A:
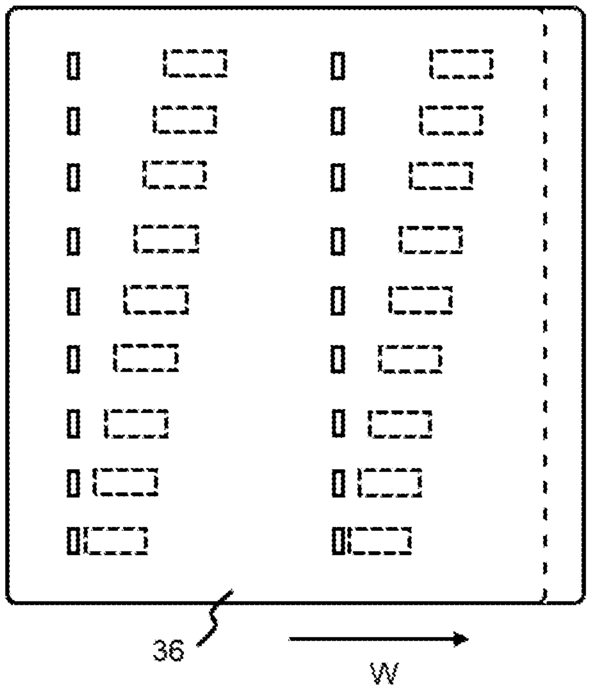
FIGS. 5A-5D are illustrations of relative positions of the cap and movable plate.

For example, when no print media is detected over the platen, the controller 24 may be configured to maintain all openings of the cap in a closed configuration as shown in FIG. 5A.

Figure 5B:
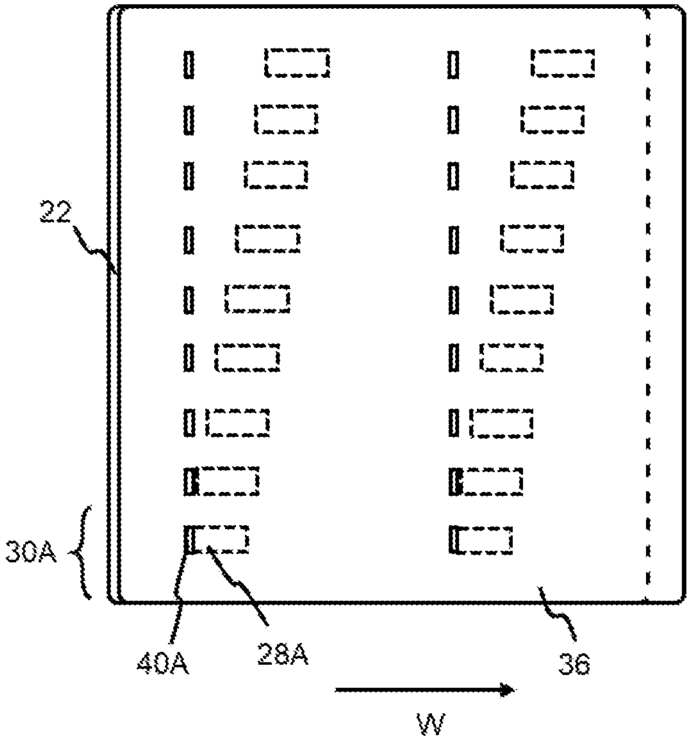

The sensor 44 may be configured to determine a position of a leading edge of the print media. When the sensor 44 detects a leading edge of the print media over a first portion of the platen 12 corresponding to the first zone 30A of the cap, the vacuum control apparatus may be configured to permit air flow through a first portion of the platen corresponding to the first zone 30A by moving the movable plate 36 in the width direction W so that openings 40A in the plate 36 overlap openings 28A in the first zone 30A of the cap 22, whilst the movable plate 36 blocks air flow through openings in the other zones of the cap 22, as shown in FIG. 5B.

Figure 5C:
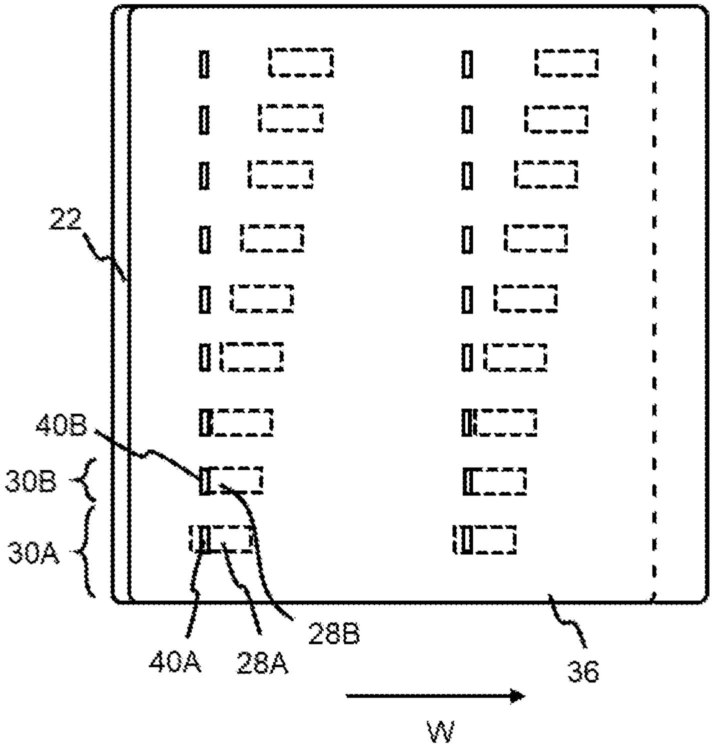

As the print media advances and it is determined that a leading edge of the print media is provided over a second portion of the platen 12 corresponding to the second zone 30B of the cap 22, and the print media continues to cover the first portion of the platen, the vacuum control apparatus may be configured to permit air flow through openings 28A, 28B and the first and second zones 30A, 3B of the cap 22 by moving the movable plate 36 further in the width direction W so that the openings 40B in the plate 36 overlap openings 28B in the second zone 30B of the cap 22, as shown in FIG. 5C.

Figure 5D:
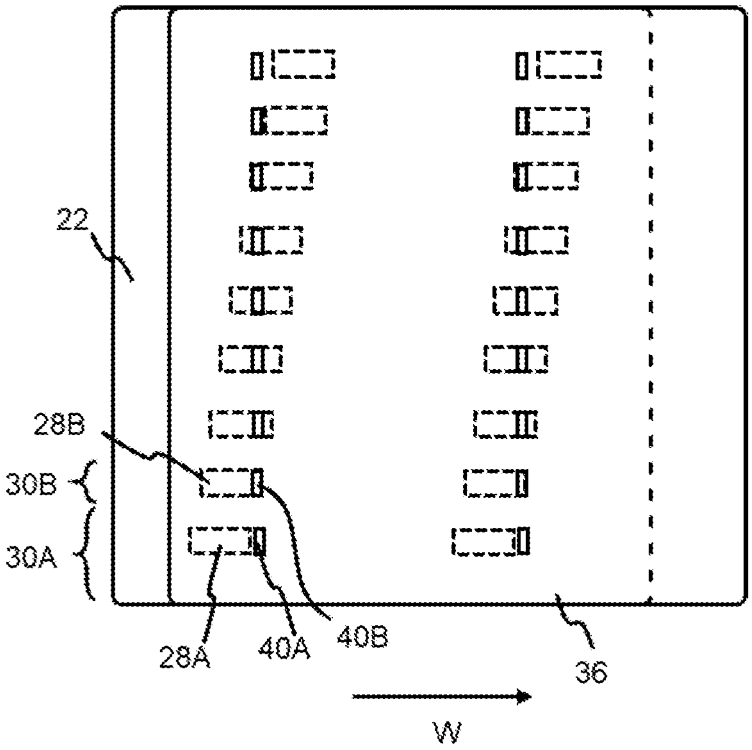

The sensor 44 may be configured to determine a position of a trailing edge of the print media. When it is determined that the trailing edge is provided over the second portion of the platen 12, the vacuum control apparatus may be configured to block airflow through the first zone 30A, as shown in FIG. 5D. The controller 24 may be configured to move the movable plate 36 further in the width direction W so that the openings 40A in the plate 36 no longer overlap the openings 28A in the first zone 30A of the cap 22.

The process of moving the plate 36 relative to the cap 22 may continue as the print media moves over the platen 12, such that air flow is only permitting through selected zones of the cap 22 corresponding to portions of the platen 12 overlain by the print media.

The printing system 10 may comprise a motor, configured to move the movable plate 36. For example, the printing system may comprise a rack attached to the moving plate and transmission elements connecting the rack and the motor, so that the motor causes movement of the moving plate.

The controller 24 may be configured to control the motor. The controller 24 may receive a signal from the sensor 44 indicating the position of the leading edge of the print media and may be configured to control the motor to move the movable plate 36 according to the position of the leading edge of the print media.

In an example, the sensor 44 may be an optical sensor provided behind the printhead 16 in the advance direction. The sensor 44 may be configured to detect the leading edge of the print media as the leading edge moves under the sensor 44. The detection by the sensor 44 of the leading edge of the print media may trigger the movement of the motor. The controller 24 may be connected to an encoder of the belt 18, to synchronize the speed of movement of the plate 36 with the movement of the belt 18.

Figure 6:
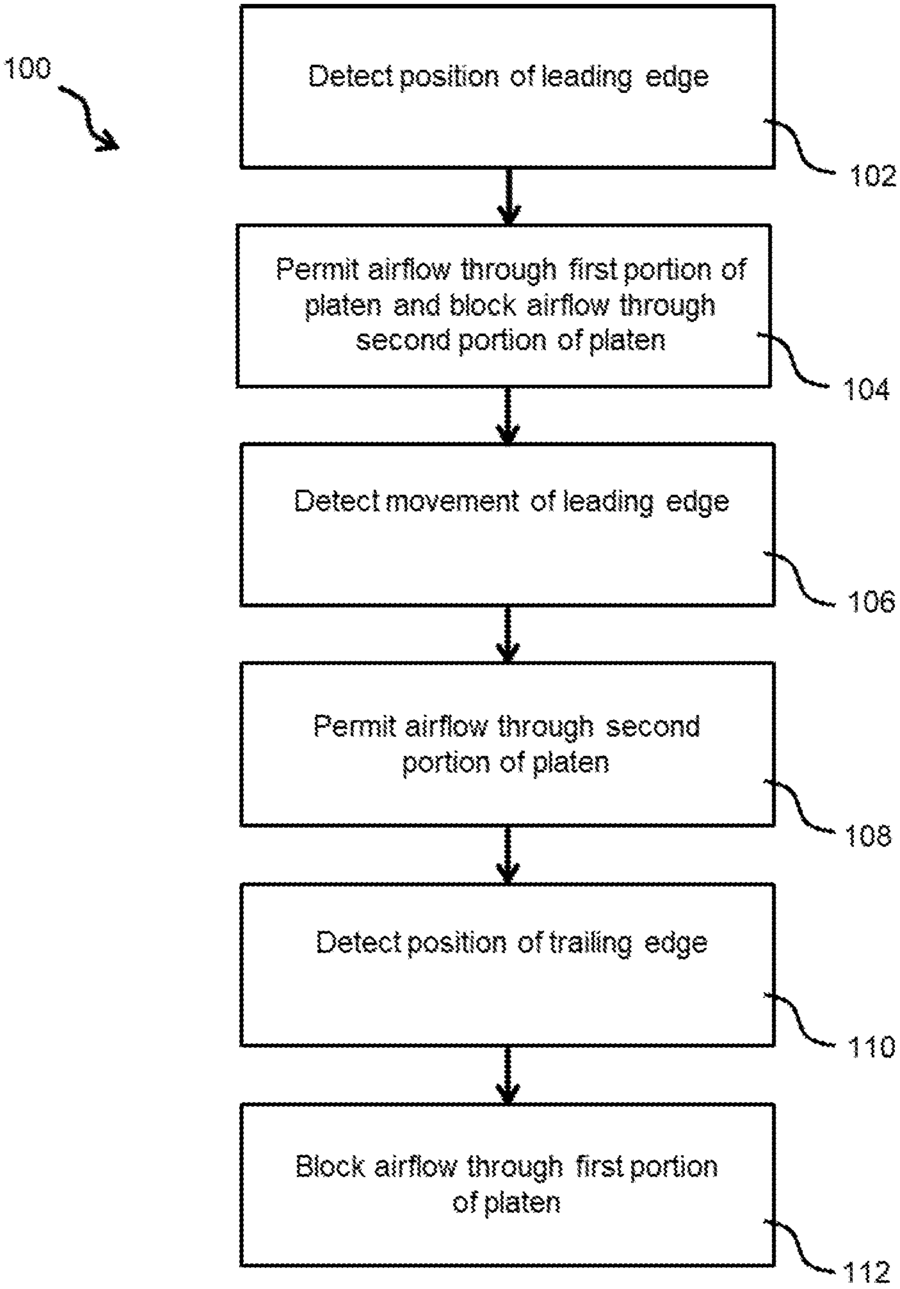
FIG. 6 is a flow chart of an example method.

FIG. 6 shows a flowchart of an example method 100. The method may be executable by the printing system 10 shown in FIG. 1.

The method comprises, in block 102 detecting a position of a leading edge of print media on the platen. In an example, a sensor, such as an optical sensor, may perform the detecting the position of the leading edge of the print media.

The method comprises, in block 104, permitting air flow through a first portion of the platen corresponding to a position of the leading edge of the print media by opening one or more openings in a first zone of a cap provided on a lower surface of the platen and blocking airflow through a second portion of the platen in front of the leading edge in a print media advance direction by closing one or more openings in a second zone of the cap corresponding to the second portion.

The opening one or more openings in a zone of the cap may comprise moving a sliding plate over the cap so that one or more openings in the sliding plate overlap respective one or more openings in the cap. The closing one or more openings in a zone of the cap may comprise covering the one or more openings with a non-transmissive region of the sliding plate.

The method comprises, in block 106, detecting movement of the leading edge of the print media in the advance direction. In an example, the detecting movement of the leading edge of the print media may comprise the sensor detecting the position of the leading edge. In another example, the detecting movement of the leading edge of the print media may comprise detecting movement of a belt that transports the print media. For example, the belt may transport the print media continuously, and the movement of edge may be determined based on the speed of movement of the belt.

The method comprises, in block 108, permitting air flow through the second portion of the platen by opening the one or more openings in the second zone when it is detected that the leading edge of the print media is over the second portion of the platen. The method may thereby comprise synchronising movement of the sliding plate with movement of the print media over the platen.

The method may further comprise, in block 110, detecting a position of a trailing edge of print media on a platen. The method may further comprise, in block 112, blocking air flow through the first portion of the platen by closing the one or more openings in the first zone when it is detected that the trailing edge is provided over the second portion of the platen. The detecting the position of the trailing edge may comprise a sensor detecting the position. In another example, the position of the trailing edge may be determined based on the length of print media and the speed of movement of the belt that transports the print media.

Permitting airflow through selected portions of the platen and blocking airflow through selected portions of the platen according to positions of the leading edge and the trailing edge of the print media may be repeated as the print media moves across the platen in the advance direction.

Examples described herein may provide an effective application of vacuum to the platen, to bias the print media to be flat. Examples described herein may improve image quality by inhibiting defects that may occur at leading and trailing edges of print media due to changes in air flow under the printer generated by a combination of air flow generated by a vacuum source at a portion of the platen not covered by print media with the air flow generated by the air flow bar.

Examples described herein may provide a simplified means for controlling vacuum applied to a platen, which may reduce the required speed and/or size of a vacuum fan and optimise vacuum pressure. Reduction of the speed of the fan may increase the life of the vacuum source and may reduce noise generated by the vacuum control apparatus. Controlling the vacuum applied to the platen so that airflow is blocked in regions of the platen not overlain by print media may reduce clogging of parts of the vacuum control apparatus of print fluid.

The invention claimed is:

1. A printing system comprising an air-transmissive platen, a vacuum source configured to draw air through the platen to bias print media towards the platen, a cap provided on a surface of the platen, between the vacuum source and the platen, the cap configured to limit air flow through the platen, the cap comprising a plurality of closable openings provided in a plurality of zones along a length of the cap in a print media advance direction, a single movable plate provided over the cap and configured to slide over each of the plurality of closable openings of the cap, and a controller configured to selectively open or close the openings of each of the plurality zones to permit airflow through a portion of the platen overlain by print media and limit airflow through a portion of the platen not overlain by print media.

2. The printing system according to claim 1, comprising a sensor configured to determine a position of the print media on the platen, wherein the controller is configured to open or close the openings of zones according to the position of the print media as the print media moves over the platen in the advance direction.

3. The printer according to claim 1, wherein the movable plate comprises a plurality of openings, and wherein the controller is configured to move the plate to overlap an opening in the plate with an opening in the cap to open the opening in the cap.

4. The printer according to claim 3, comprising a motor, wherein the controller is configured to control the motor to move the moveable plate to a position according to a position of the print media in the advance direction.

5. The printer according to claim 3, wherein the plurality of openings in the movable plate are provided at positions in the length direction of the plate corresponding to openings in the zones of the cap, and wherein positions of openings in one of the cap or the movable plate are stepped in a width direction in neighbouring zones and the positions of the openings in the other of the cap and the movable plate are aligned in the advance direction.

6. The printer according to claim 3, wherein the cap and the movable plate each extend over the length of the platen.

7. The printer according to claim 1, wherein the static cap comprises a plurality of dividers extending from a surface of the cap to the platen, wherein the dividers are configured to separate a volume between the cap and the platen into the plurality of zones, and wherein the dividers seal the zones from each other.

8. A method of controlling a vacuum applied to print media through an air-transmissive platen, comprising:

detecting a position of a leading edge of print media on the platen, permitting air flow through a first portion of the platen corresponding to a position of the leading edge of the print media by opening one or more openings, of a plurality of closable openings, in a first zone of a cap provided on a lower surface of the platen and blocking air flow through a second portion of the platen in front of the leading edge in a print media advance direction by closing one or more openings in a second zone of the cap corresponding to the second portion, wherein the opening one or more openings across all zones of the cap comprises moving a single sliding plate over the cap so that one or more openings in the sliding plate overlap respective one or more openings in the cap and so that the sliding plate slides over each of the plurality of closable openings of the cap, detecting movement of the leading edge of the print media in the advance direction; and permitting air flow through the second portion of the platen by opening the one or more openings in the second zone when it is detected that the leading edge of the print media is over the second portion of the platen.

9. The method according to claim 8, comprising detecting a position of a trailing edge of print media on a platen and blocking air flow through the first portion of the platen by closing the one or more openings in the first zone when it is detected that the trailing edge is provided over the second portion of the platen.

10. The method according to claim 8, wherein closing one or more openings in a zone of the cap comprises covering the one or more openings with a non-transmissive region of the sliding plate.

11. The method according to claim 10 comprising synchronising movement of the sliding plate with movement of the print media over the platen.

12. A vacuum control apparatus for a printer having an air-transmissive platen and a vacuum source, the vacuum control apparatus comprising:

a static cap for attaching to a lower surface of the platen, the static cap comprising a planar surface and a plurality of openings provided in the planar surface;

a single sliding plate configured to slide over each of the plurality of openings provided in the planar surface of the static cap, the sliding plate comprising a plurality of openings;

a motor configured to move the sliding plate; and a controller configured to receive a signal indicating a position of print media on the platen and configured to control the motor to move the sliding plate to open one or more openings in a selected zone of the static cap by overlapping one or more openings in the sliding plate with one or more openings in the static cap.

13. The vacuum control apparatus according to claim 12, wherein the static cap comprises one or more walls extending from the planar surface and configured to divide the static cap into a plurality of zones in a length direction of the static cap, wherein each zone extends across a width of the static cap and wherein the walls are configured to seal against the platen to seal the plurality of zones from each other.

14. The vacuum control apparatus according to claim 12, wherein the controller is configured to synchronise the movement of the sliding plate with the movement of print media on the platen, so that openings in the static cap corresponding to portions of the platen covered by print media are opened and openings in the static cap corresponding to portion of the platen not covered by print media are closed.

15. The vacuum control apparatus according to claim 12, wherein a position of the openings in neighbouring zones of the static cap are stepped relative to each other in a width direction, and wherein positions of the openings in the sliding plate are aligned along a longitudinal direction of the sliding plate in positions corresponding to the positions of the openings in the static cap in the length direction.

* * * * *